United States Patent
Nomura et al.

(10) Patent No.: US 7,391,444 B1
(45) Date of Patent: Jun. 24, 2008

(54) IMAGE PICKUP APPARATUS CAPABLE OF SELECTING OUTPUT ACCORDING TO TIME MEASURED BY TIMER

(75) Inventors: Toshio Nomura, Ichihara (JP); Maki Takahashi, Chiba (JP); Tomoko Aono, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 483 days.

(21) Appl. No.: 09/619,917

(22) Filed: Jul. 20, 2000

(30) Foreign Application Priority Data

Jul. 23, 1999 (JP) ................................. 11-208471

(51) Int. Cl.
H04N 5/262 (2006.01)
H04N 5/228 (2006.01)
H04N 5/222 (2006.01)
H04N 9/74 (2006.01)
G06K 9/20 (2006.01)

(52) U.S. Cl. ................... 348/239; 348/333.12; 348/586; 348/222.1; 382/283

(58) Field of Classification Search ................. 348/143, 348/149, 208.14, 239, 333.12, 586–592; 382/282, 283; 345/629
See application file for complete search history.

(56) References Cited

U.S. PATENT DOCUMENTS

| | | | | |
|---|---|---|---|---|
| 4,968,132 A | * | 11/1990 | Ferren | 352/46 |
| 5,267,333 A | * | 11/1993 | Aono et al. | 382/284 |
| 5,592,301 A | | 1/1997 | Shimada | |
| 5,684,898 A | * | 11/1997 | Brady et al. | 382/282 |
| 5,748,775 A | * | 5/1998 | Tsuchikawa et al. | 382/190 |
| 5,764,306 A | * | 6/1998 | Steffano | 348/586 |
| 5,781,198 A | * | 7/1998 | Korn | 345/634 |
| 5,809,161 A | * | 9/1998 | Auty et al. | 382/104 |
| 5,812,787 A | * | 9/1998 | Astle | 348/586 |
| 5,914,748 A | * | 6/1999 | Parulski et al. | 348/239 |
| 6,301,382 B1 | * | 10/2001 | Smith et al. | 348/586 |
| 6,377,269 B1 | * | 4/2002 | Kay et al. | 348/584 |
| 6,421,462 B1 | * | 7/2002 | Christian et al. | 382/219 |
| 6,532,022 B1 | * | 3/2003 | Ahmad | 345/629 |
| 6,549,577 B2 | * | 4/2003 | Florencio et al. | 375/240.21 |
| 6,621,524 B1 | * | 9/2003 | Iijima et al. | 382/282 |
| 6,721,014 B1 | * | 4/2004 | Ariga | 348/374 |

FOREIGN PATENT DOCUMENTS

| | | |
|---|---|---|
| EP | 0 713 332 | 5/1996 |
| EP | 0 853 426 A2 | 7/1998 |
| JP | 10-21408 | 1/1998 |

OTHER PUBLICATIONS

English version of the Search Report dated Aug. 25, 2004.

* cited by examiner

*Primary Examiner*—Nhan T. Tran
(74) *Attorney, Agent, or Firm*—David G. Conlin; John J. Penny, Jr.; Edwards Angell Palmer & Dodge LLP (57) ABSTRACT

In an image pickup apparatus, timer 2 starts a time measuring operation when a shutter button is pressed. When a time T1 is measured by timer 2, the image from CCD 1 is output as a background image to a background image buffer 4. In addition, when a time (T1+T2) is measured by timer 2, the image from CCD 1 is output as a normal image to a region extracting portion 5 and image compressing portion 6. The background image mainly refers to an image only including a background. The normal image mainly refers to an image with an object of interest arranged in front of the background.

8 Claims, 7 Drawing Sheets

IMAGE PICKUP APPARATUS CAPABLE OF SELECTING OUTPUT ACCORDING TO TIME MEASURED BY TIMER

BACKGROUND OF THE INVENTION

1. Field of the Invention

The present invention relates to image pickup apparatuses such as electronic still cameras and digital video cameras, and more particularly, to an image pickup apparatus for taking an image including only a background image but not an object and an image including the object.

2. Description of the Background Art

Japanese Patent Laying-Open No. 10-21408 discloses, for example as a conventional image pickup apparatus of this type, a technique of automatically extracting an object region from a moving image with stable accuracy and at a high speed independently of the shape of the object and the characteristic of image data by using a background image and an object image.

In the conventional example, the object image and the background image are taken in the same mode so as to minimize a difference between image data corresponding to the background. After the images are taken, differential data of the background and object images is produced. Further, the differential data is averaged and subjected to a process utilizing a threshold value. Thereafter, the region of the object is extracted based on the difference between the image data of the background and object images. The extracted image data are compressed, encoded, and recorded.

However, in general cases including the above mentioned example, a shutter must be pressed twice to input (take) background and object images. If an image pickup apparatus is fixed by a tripod or the like, the pickup apparatus slightly moves when pressing the shutter. This results in a problem that the background image and a portion of the object image corresponding to the background do not completely match.

To avoid this problem, a background without any pattern, such as a plain colored wall, has often been used. In this case, an adverse effect due to the slight movement of the image pickup apparatus can be avoided. However, it is extremely difficult to prepare a plain colored background for normal, and especially outdoor picture taking.

The image pickup apparatus may be designed such that the shutter can be pressed by a remote controller. However, this increases the cost of the image pickup apparatus and results in another problem that the remote controller must be carried on.

Another possible approach is that the shutter is pressed by a release as in a normal optical camera. However, even if the shutter button would not be directly pressed, the image pickup apparatus may still be moved slightly due to connection to the release, thereby causing another problem that a person other than the object is required for picture taking.

SUMMARY OF THE INVENTION

Therefore, an object of the present invention is to provide an image pickup apparatus preventing the movement of the apparatus when taking an image including only a background and that including an object.

The image pickup apparatus according to the present invention takes a first image including only a background but not an object and a second image including an object, and has a shutter button which is pressed for releasing the shutter. The image pickup apparatus is characterized in that it includes: a time measuring portion measuring a period of time after the shutter button is pressed; and an output selecting portion outputting as one of the first and second images an image which has been taken when a first period of time is measured by the time measuring portion, and outputting as the other of the first and second images an image which has been taken when a second period of time is measured by the time measuring portion after the first period of time is elapsed.

Thus, once the shutter button is pressed, the first and second images can be taken without touching the image pickup apparatus.

Accordingly, a portion of a background of the second image and the first image match, so that the region of the object can be extracted with high accuracy. In addition, since a remote controller is not required for pressing the shutter, the image pickup apparatus can be achieved with a low cost. Furthermore, since a plain colored background needs not be prepared, images can be taken under various conditions and flexibility of the image pickup apparatus is increased.

In addition, since the picture-taking person can press the shutter button, he or she can be the object. Namely, picture taking can be performed only by the object.

The image pickup apparatus of the present invention preferably includes: a region extracting portion outputting information indicating an object region of the second image by using the first and second images; and a recording portion recording onto a recording medium the data of positional information of the object region as well as the second image data or the image data included in the object region.

Thus, the data indicating the object region is recorded during picture taking, so that the object region can be extracted after picture taking.

Therefore, a user can always replace the background region of the second image with a desired image. More specifically, a desired image can be used as a background of the object image.

The image pickup apparatus according to the present invention preferably includes: a region extracting portion outputting positional information on the object region in the second image by using the first and second images; an image composing portion replacing an image of a region other than the object region in the second image with a prepared background image; and a recording portion recording data of an image composed by the image composing portion onto a recording medium.

Therefore, a user can always replace the background region of the second image with a desired image.

Thus, the composed image can be verified as it is obtained.

In addition, the image pickup apparatus according to the present invention preferably updates the first image by using the image of the region other than the object region in the second image every time a prescribed period is elapsed.

As a result, the object region can be stably extracted even if the background image of the second image changes over time.

In addition, the image pickup apparatus according to the present invention preferably includes a recording portion recording the first and second image data onto a recording medium.

Thus, the region needs not be extracted in real time during picture taking, so that the burden on the image pickup apparatus can be reduced during picture taking.

In addition, the image pickup apparatus according to the present invention preferably includes a notifying portion notifying a timing at which pickup of the first image is completed and a timing at which pickup of the second image is started.

Thus, the image pickup states of the first and second images can be recognized by the user, so that the images are successfully taken.

In the image pickup apparatus according to the present invention, preferably, the recording portion records the data in a compressed form.

Thus, an amount of information recorded by the recording portion and that processed by the image pickup apparatus are reduced.

DESCRIPTION OF THE PREFERRED EMBODIMENTS

Now, embodiments of an image pickup apparatus of the present invention will be described with reference to the drawings.

First Embodiment

Figure 1:
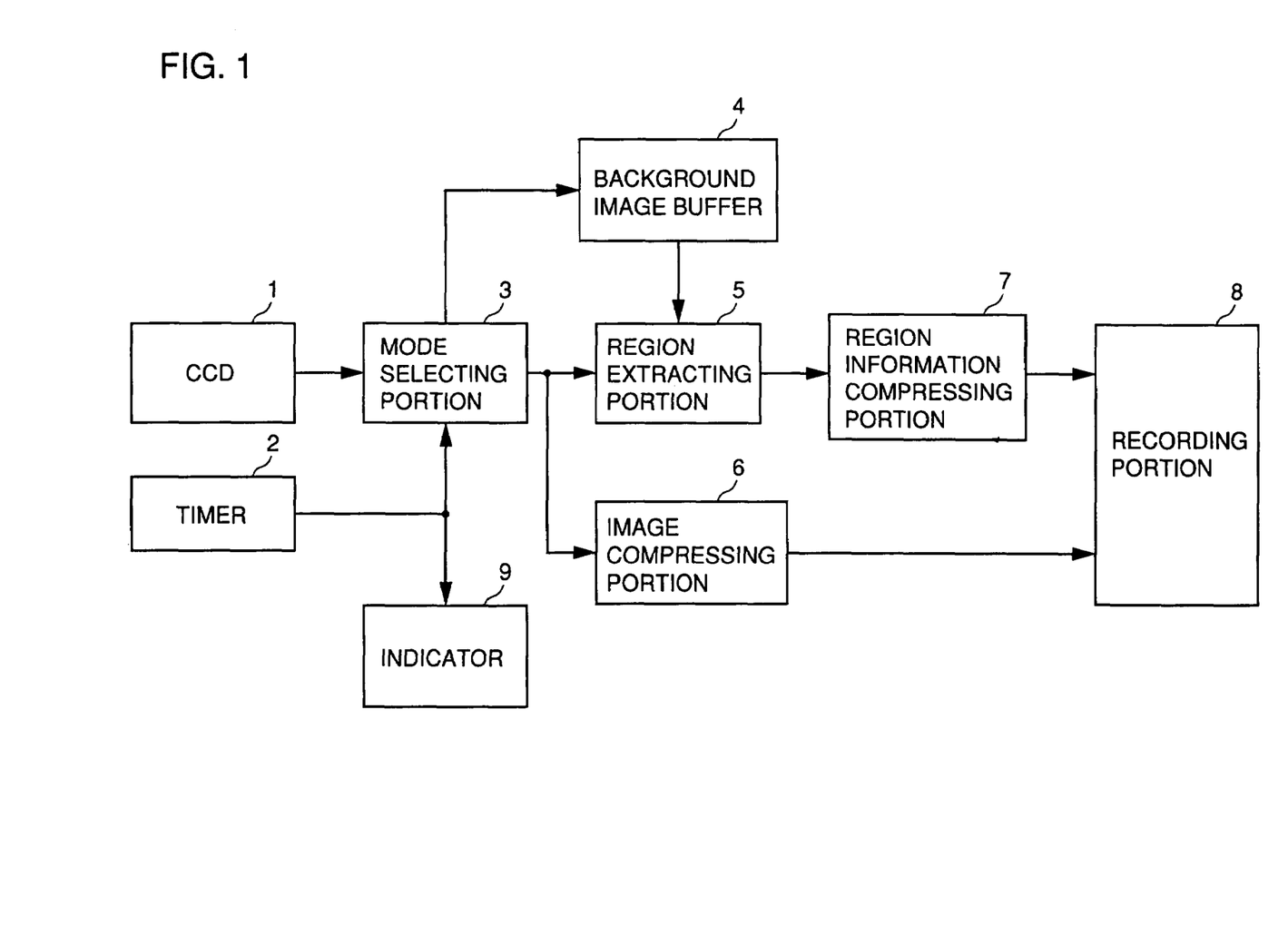
FIG. 1 is a block diagram showing a schematic arrangement of an image pickup apparatus according to a first embodiment of the present invention.

Referring to FIG. 1, the image pickup apparatus of the present embodiment includes a CCD (Charge Coupled Device) 1, a timer 2 (a time measuring portion), and a mode selecting portion 3 (an output selecting portion). CCD 1 converts an optical image received by a lens (not shown) to an electric signal. Timer 2 measures a time after a shutter button is pressed in the image pickup apparatus. Mode selecting portion 3 switches between a mode of outputting a background image (a first image) not including an object to be extracted and a mode of outputting a normal image (a second image) including an object to be extracted in accordance with a time measured by timer 2.

Figure 2A:
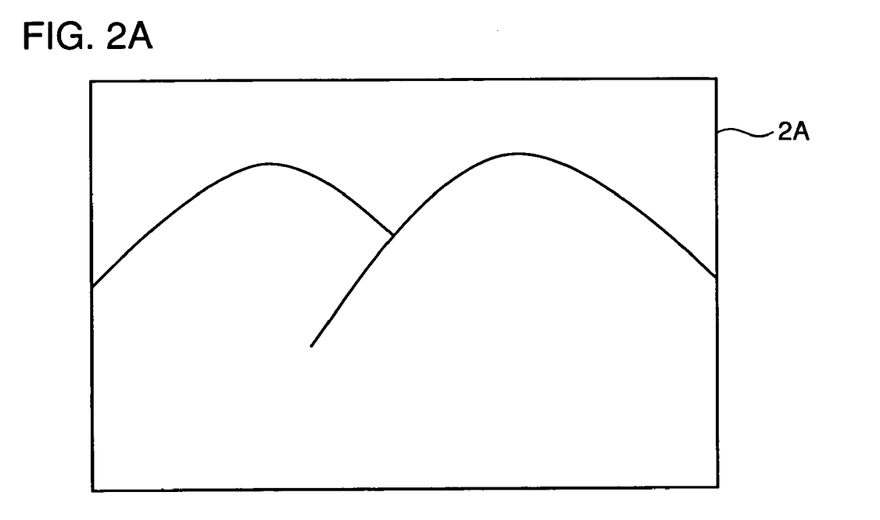
FIGS. 2A and 2B are diagrams respectively shown for explaining background and normal images.

Referring to FIG. 2A, the background image refers to an image including only a background as denoted by image 2A. The background image is generally a still image, but may be an image obtained by taking an average of moving images within a prescribed period of time.

Figure 2B:
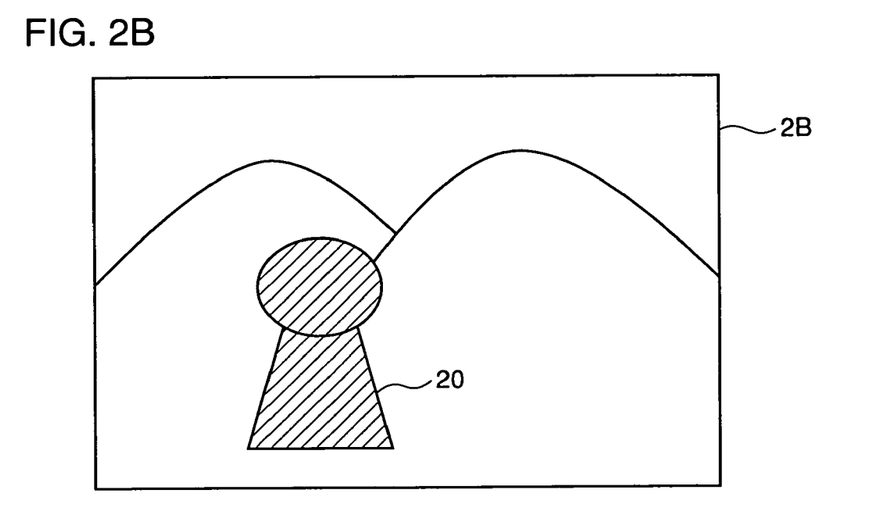

Referring to FIG. 2B, the normal image refers to an image including an object 20 to be extracted (hereinafter referred to as "a target object") arranged in front of the background as denoted by image 2B. The normal image may be a still image or a moving image.

It is noted that the image pickup apparatus of the present embodiment takes a still image as the background image and takes a moving image as the normal image.

Returning back to FIG. 1, the image pickup apparatus of the present embodiment includes a background image buffer 4 and a region extracting portion 5. Background image buffer 4 stores a background image output from mode selecting portion 3. Region extracting portion 5 extracts a region with the target object (hereinafter referred to as "an object region") from the normal image output from mode selecting portion 3 and the background image stored in background image buffer 4 for outputting it as region information of binary or multi-level data.

In addition, the image pickup apparatus of the present embodiment includes an image compressing portion 6, region information compressing portion 7, recording portion 8, and indicator 9. Image compressing portion 6 performs a general image compressing process on the normal image output from mode selecting portion 3. Region information compressing portion 7 compresses the region information output from region extracting portion 5 for outputting it as mask data. Recording portion 8 records the compressed normal image and region information onto a recording medium. Indicator 9 is attached in front of the image pickup apparatus so as to be visually recognizable to a person, e.g., an object. Indicator 9 is an exemplary notifying portion and designed to change its lighting state in accordance with a time measured by timer 2. It is for example a small red LED (Light Emitting Diode).

Figure 3:
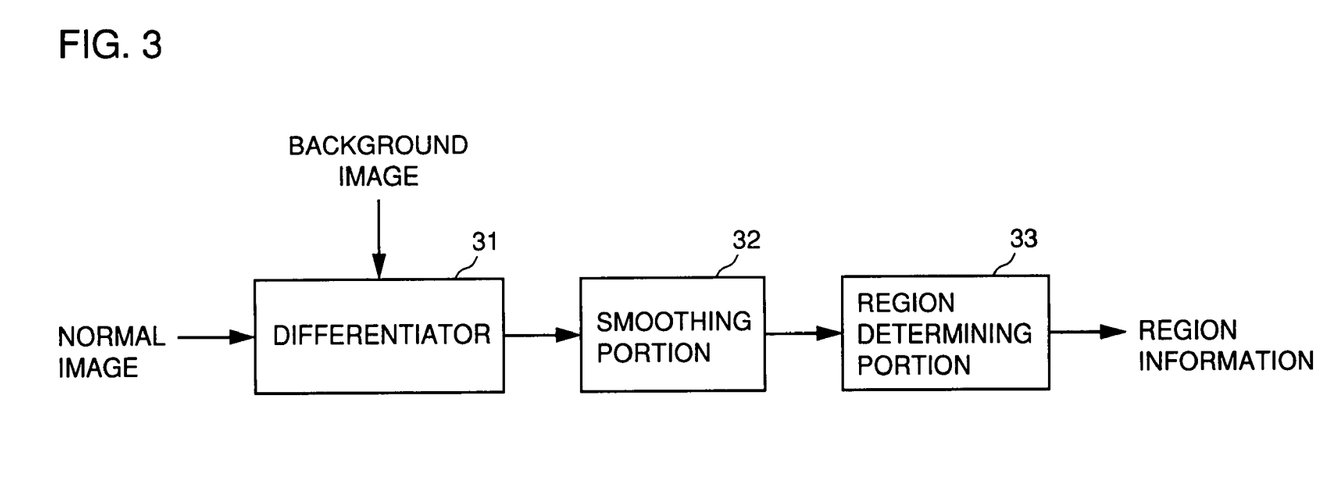
FIG. 3 is a block diagram showing a region extracting portion of the image pickup apparatus shown in FIG. 1.

It is noted that region extracting portion 5 includes a differentiator 31, smoothing portion 32, and region determining portion 33, with reference to FIG. 3. Differentiator 31 calculates a difference between the normal and background images. Smoothing portion 32 smoothes the difference output from differentiator 31. Region determining portion 33 separates the regions in accordance with a prescribed threshold value for outputting region information of binary or multi-level data as the target object region.

In other words, basically, region extracting portion 5 calculates the difference between the normal and background images. Then, when the difference between the background image shown as image 2A in FIG. 2A and the normal image shown as image 2B in FIG. 2B is calculated, ideally, only the region with object 20 (the object region) has a difference with a large absolute value, whereas the difference in the peripheral region of object 20 is nearly 0. Thus, the object region can be separated.

It is noted that a certain process is often performed after the difference is calculated in the actual procedure. Then, as described above, the separation of the region is performed based on the fact that the difference in the object region and that in the region other than the object region can be separated in accordance with a given threshold value. Thus, generally, as the difference in the region other than the object region comes close to 0, a separation performance increases.

In addition, the image obtained by calculating the difference between the normal and background images tends to have noises near edges. Accordingly, the process of determining the region by using the threshold value is preferably performed after the smoothing process. Thus, the region can be extracted with higher accuracy.

Next, the operation of the image pickup apparatus of the present embodiment will be described.

The image received by CCD 1 is transmitted to mode selecting portion 3. Then, the image is output to background image buffer 4 in the background image pickup mode, but to region extracting portion 5 and image compressing portion 6 in the normal image pickup mode.

Figure 4:
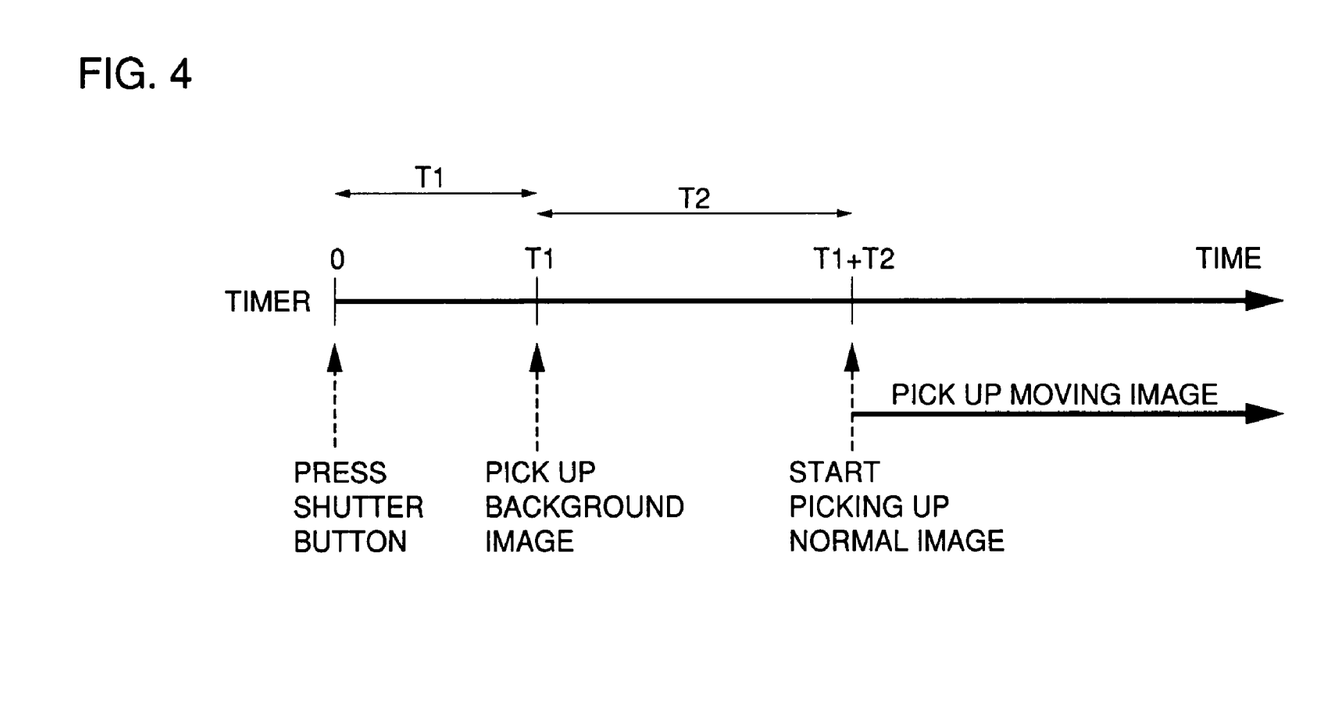
FIG. 4 is a diagram shown in conjunction with an image pickup operation in the image pickup apparatus shown in FIG. 1.

Here, referring to FIG. 4, the operation of the image pickup apparatus when the shutter is pressed will be described. FIG. 4 is a timing chart shown in conjunction with the operation after the shutter button is pressed in the image pickup apparatus, where an origin (a point of 0) of an abscissa corresponds to the point at which the shutter button is pressed.

When a time T1 as measured by timer 2 is elapsed after the shutter button is pressed, the background image is taken. The picked up background image is output to background image buffer 4. Further, when a time T2 as measured by timer 2 is elapsed, pickup of the normal image is started. The picked up normal image is output to region extracting portion 5 and image compressing portion 6.

It is noted that the image pickup apparatus moves at the moment that the shutter button is pressed. Thus, time T1 must have a value greater than 0. Further, the object may be arranged in front of the background during time T2. In the image pickup apparatus, times T1 and T2 may arbitrarily be changed by a person taking the image depending on image pickup conditions.

In image compressing portion 6, general image compression is performed, and compressed data of the normal image is recorded onto the recording medium by recording portion 8. In addition, region extracting portion 5 extracts the target object region from the normal and background images, and region information indicating the object region is output to region information compressing portion 7. Then, the region information is recorded as mask data onto the recording medium by recording portion 8 after being compressed by region information compressing portion 7.

Accordingly, the object region can be extracted by using the mask data recorded in the recording medium and the compressed data of the normal image. Thus, the image of the background region (the region other than the object region in the normal image) can arbitrarily be replaced by an arbitrary background image for replacement at any point of time, for example when the normal image is displayed.

As described above, in the image pickup apparatus of the present embodiment, the background image is taken at the point when time T1 is elapsed after the shutter button is pressed and the pickup of the normal image is started at the point when time (T1+T2) is elapsed. Namely, the person taking the image needs not touch the image pickup apparatus when the background and normal images are taken. In addition, the operation state of the image pickup apparatus automatically transfers from pickup of the background image to the normal image.

Accordingly, the movement of the image pickup apparatus is prevented during pickup of the background and normal images, and the difference between the background image and the image in the background region of the normal image can be reduced. Thus, the differential value of the background region can approximate to 0, so that the object region can be extracted with high accuracy.

In addition, by changing the lighting pattern of indicator 9, the person to be the object can recognize the state of the image pickup apparatus. More specifically, the light of indicator 9 is turned on immediately after the shutter button is pressed. Then, the light of indicator 9 gradually starts turning on and off five seconds before the start of the pickup of the normal image, and more rapidly turns on and off three seconds before the start of the pickup. Thus, the person to be an object can prepare for the pickup more precisely. As a result, the pickup is reliably performed.

Further, for the region which is determined the background region in region extracting portion 5, the background image stored in background image buffer 4 is preferably updated when a prescribed period of time is elapsed. Thus, an optimum background image can always be held in accordance with a change in background image over time. It is noted that the background image changes over time, for example when a slight change occurs to the image of the background region due to a change in illumination condition over time during outdoor picture taking.

It is noted that the recording medium may record compressed data including only an image in the object region of the normal image, instead of compressed data of the normal image. This is because, normally, a partial image is often processed as a set of compressed data and mask data of the image included in the object region. Namely, this facilitates utilization of the image of the object region as the partial image.

It is noted that the image pickup apparatus of the present embodiment may be designed to recognize as the normal image the image taken at the point when time T1 is elapsed after the shutter is pressed, and recognize as the background image the image taken at the point when time T2 is further elapsed (at the point when time (T1+T2) is elapsed after the shutter is pressed), depending on its setting. In other words, such setting allows the image pickup apparatus to take the image including the object when the shutter is pressed and then to take the image including only the background and not the object.

Second Embodiment

Figure 5:
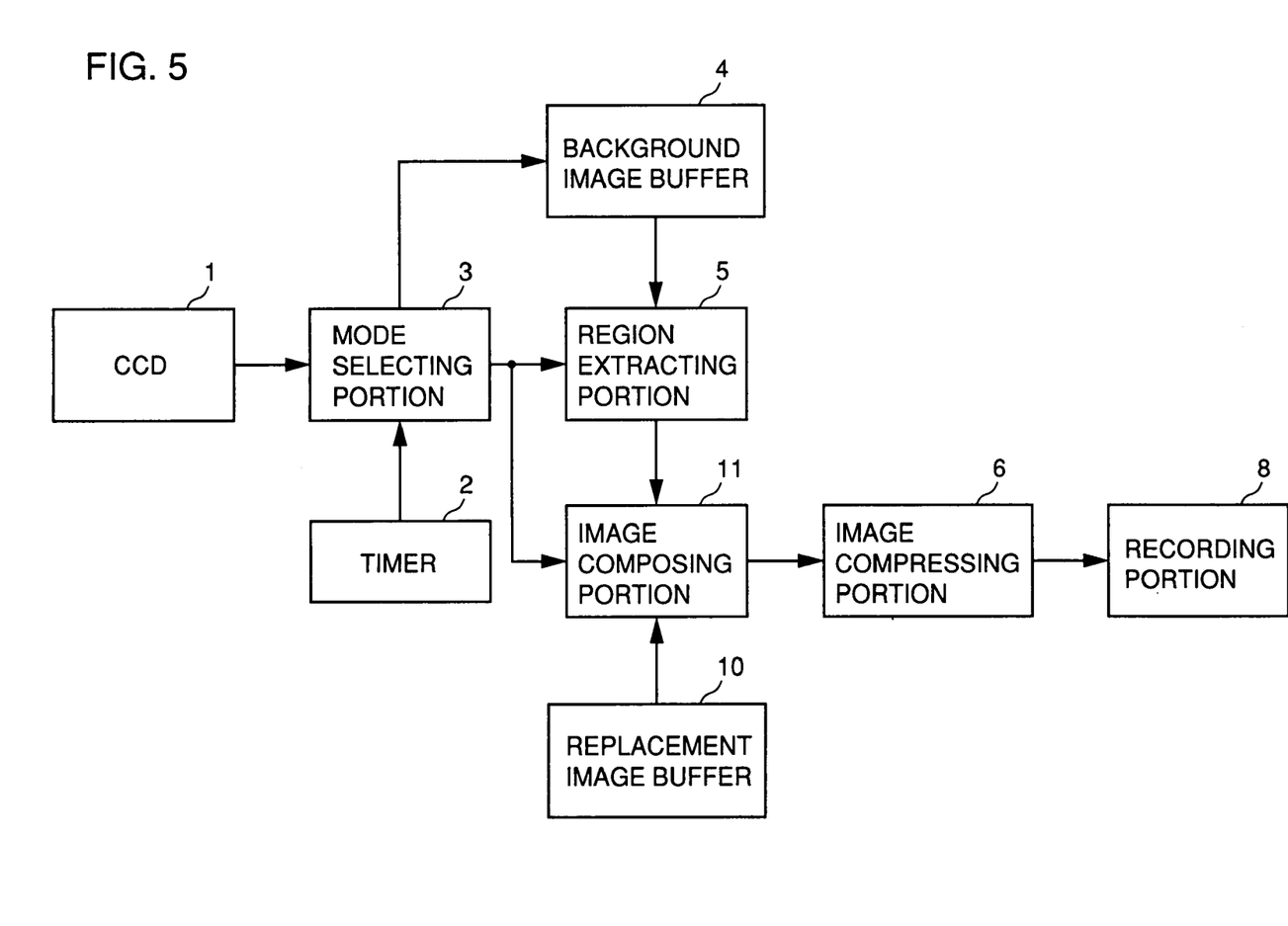
FIG. 5 is a block diagram showing a schematic arrangement of an image pickup apparatus according to a second embodiment of the present invention.

Referring to FIG. 5, an image pickup apparatus of the present embodiment includes a CCD 1, timer 2, mode selecting portion 3, background image buffer 4, region extracting portion 5, image compressing portion 6, and recording portion 8 as components similar to those of the image pickup apparatus of the first embodiment.

In addition, the image pickup apparatus of the present embodiment includes a replacement image buffer 10 and image composing portion 11. Replacement image buffer 10 stores a background image for replacement. Image composing portion 11 replaces a region other than the object region of the normal image (background region) with the background image for replacement stored in replacement image buffer 10.

The operation of the image pickup apparatus of the present embodiment will be described. The image received by CCD 1 is stored in background image buffer 4 as the background image in a background image pickup mode, but is output to region extracting portion 5 and image composing portion 11 as the normal image in the normal image pickup mode.

Region extracting portion 5 extracts only the region of the target object from the background and normal images, and region information of binary or multilevel data, i.e., the extracted result, is output to image composing portion 11. Image composing portion 11 uses the region information from region extracting portion 5 to extract only the object region from the normal image, and replaces the other background region with the background image for replacement stored in replacement image buffer 10.

Figure 6A:
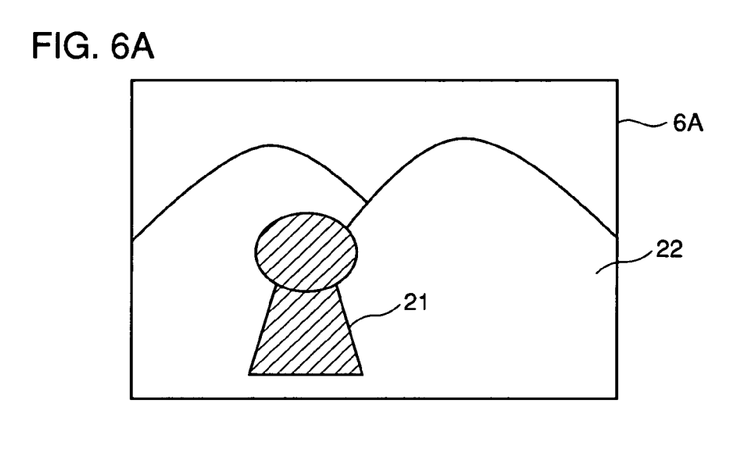
FIGS. 6A to 6C are diagrams shown in conjunction with an operation of an image composing portion of the image pickup apparatus shown in FIG. 5.
Figure 6B:
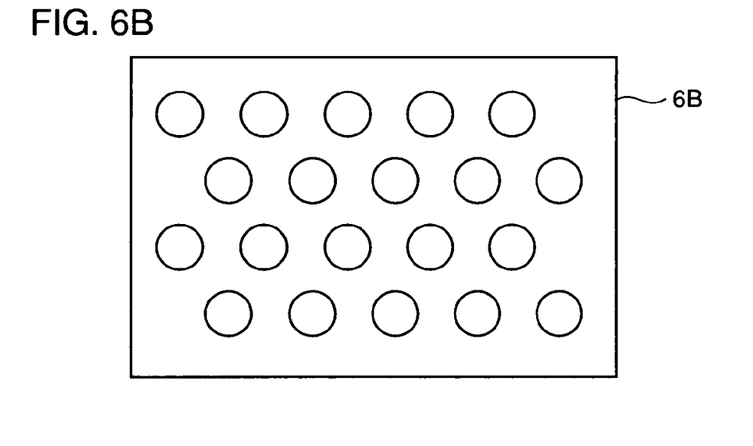
Figure 6C:
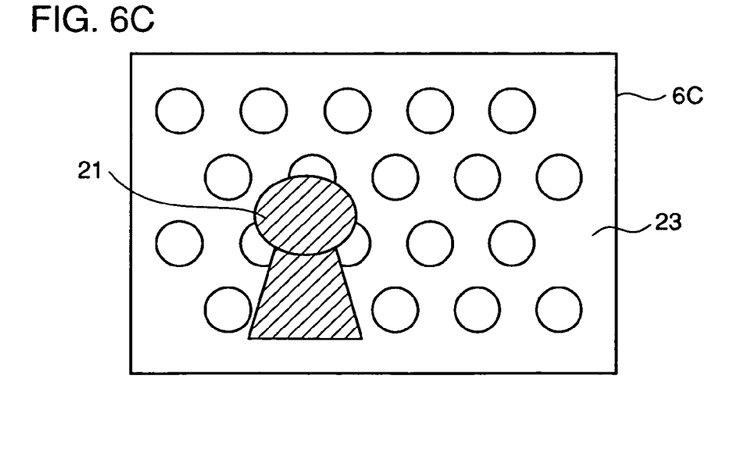

For example, for image 6A which is an exemplary normal image shown in FIG. 6A, object 21 and background 22 are separated based on the region information obtained from region extracting portion 5. Then, a portion of background 22 is replaced by background image for replacement background 6B shown in FIG. 6B, and a composed image 6C including object 21 and background 23 as shown in FIG. 6C is output.

The composed image which is output from image composing portion 11 is compressed at image compressing portion 6, and then recorded in the recording medium by recording portion 8. More specifically, in the present embodiment, compressed data of the image with its background replaced is only recorded onto the recording medium, but mask data is not recorded. Thus, the amount of recording information can be reduced. In addition, the image with the replaced background image can be verified on the spot. It is noted that the background image for replacement is not limited to a still image and may be a moving image.

Third Embodiment

Figure 7:
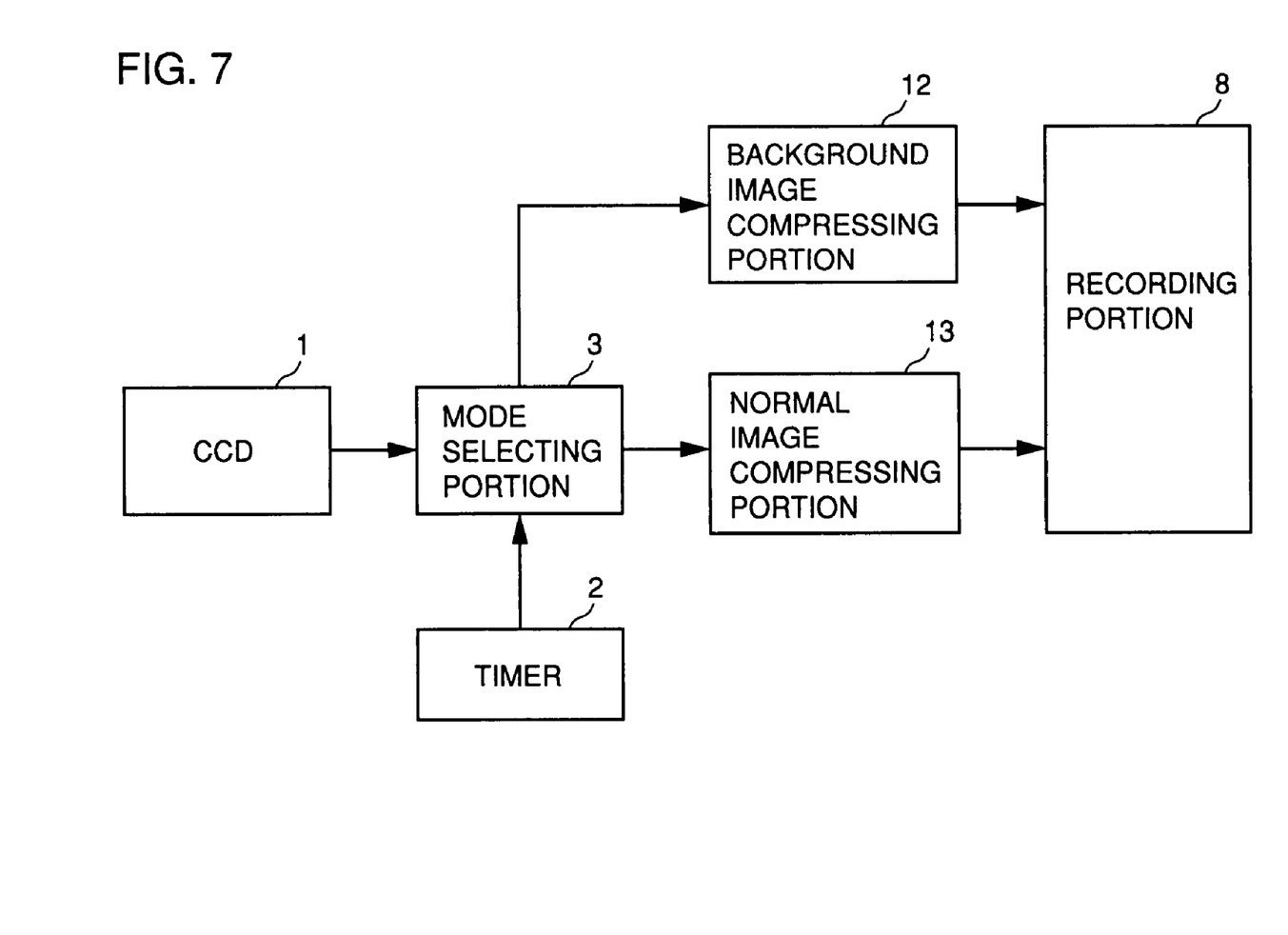
FIG. 7 is a diagram showing a schematic arrangement of an image pickup apparatus according to a third embodiment of the present invention.

Referring to FIG. 7, an image pickup apparatus of the present embodiment includes a CCD 1, timer 2, mode selecting portion 3, and recording portion 8 as components similar to those of the image pickup apparatus of the first embodiment.

Further, the image pickup apparatus of the present embodiment includes a background image compressing portion 12 and normal image compressing portion 13. Background image compressing portion 12 compresses the background image output from mode selecting portion 3 for outputting it to recording portion 8. Normal image compressing portion 13 compresses the normal image output from mode selecting portion 3 for outputting it to recording portion 8.

In the present embodiment, an object region is not extracted from the picked up background and normal images. Rather, the background and normal images are compressed and recorded onto the recording medium by recording portion 8.

Namely, the objet region is not extracted in real time during the pickup operation. Thus, the amount of picture taking process is reduced. In this case, the compressed background and normal image data are decoded during reproduction, and the object region may be extracted by using them. Thus, a user can extract the object region by using an apparatus other than the image pickup apparatus such as a personal computer and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image pickup apparatus taking a first image including only a background but not an object and a second image including the object, and having a shutter button for releasing a shutter, comprising:

a time measuring portion measuring a time after said shutter button is manually pressed; and an output selecting portion outputting only a single image taken when a first predetermined period of time is measured by said time measuring portion as said first image, and outputting an image taken when a second predetermined period of time is further measured by said time measuring portion after the first period of time as the second image, wherein said first image is updated by using an image of a region of said second image other than the object region of said second image every time a prescribed period is elapsed, only said single image is taken before said second predetermined time is measured, and said shutter button is located on a body of said image pickup apparatus.

2. The image pickup apparatus according to claim 1, further comprising:

a region extracting portion using said first and second images for outputting information of an object region of said second image; and a recording portion recording positional information data of said object region, and one of data representing said second image and image data included in said object region onto a recording region.

3. The image pickup apparatus according to claim 1, further comprising:

a region extracting portion using said first and second images for outputting positional information of an object region of said second image;

an image composing portion replacing an image in a region other than said object region of said second image with a prepared background image; and a recording portion recording data of the image composed by said image composing portion onto a recording medium.

4. The image pickup apparatus according to claim 1, further comprising a recording portion recording the data of said first image and second image onto a recording medium.

5. The image pickup apparatus according to claim 1, further comprising a notifying portion notifying a timing at which pickup of said first image is finished and a timing at which pickup of said second image is started.

6. The image pickup apparatus according to claim 2, wherein said recording portion records said positional information data in a compressed form.

7. The image pickup apparatus according to claim 3, wherein said recording portion records said data in a compressed form.

8. An image pickup apparatus taking a first image including only a background but not an object and a second image including the object, and having a shutter button for releasing a shutter, comprising:

a time measuring portion measuring a time after said shutter button is manually pressed; and an output selecting portion outputting only a single image taken when a first predetermined period of time is measured by said time measuring portion as said first image, and outputting an image taken when a second predetermined period of time is further measured by said time measuring portion after the first period of time as said second image, wherein said first image is updated by using an image of a region of said second image other than the object region of said second image every time a prescribed period is elapsed, wherein only said single image is taken before said second predetermined time is measured, and said shutter button is located on a body of said image pickup apparatus.

* * * * *